Patented Sept. 4, 1951

2,567,097

UNITED STATES PATENT OFFICE 2,567,097

MULTIPLE IMPREGNATION OF PAPER-MAKER'S FELT

Orion William Berglund, Dayton, Ohio, assignor to The Orr Felt & Blanket Company, Piqua, Ohio, a corporation of Ohio No Drawing. Application December 23, 1946, Serial No. 718,116

5 Claims. (Cl. 117—76)

This invention relates to felts for paper making or like machines and to a method of preparing such felts.

It is an object of this invention to provide paper making or like felts which have a high degree of wettability and a low wetting time.

It is another object of this invention to provide paper making or like felts which have a high degree of abrasion resistance.

These and other objects are accomplished by first impregnating the felt with an aqueous solution of synthetic resin, curing and ageing said resin, thereafter impregnating the pretreated felt with an aqueous emulsion of synthetic rubber and curing said rubber material.

As the resin, urea-formaldehyde resins and phenol-formaldehyde resins were found most suitable; however, any other water soluble synthetic resin is operative. A solution having a concentration of from 10 to 30% is the range preferred. The same concentration was used in the latex-containing emulsion for the second treatment.

The latices giving particularly good results were butadiene acrylonitrile copolymers, butadiene styrene copolymers, and neoprene. However, other synthetic rubbers are also operative.

The felts usually contain more or less acid which originates from pretreating processes; neutralization of this acid is necessary in order to obtain uniform impregnation of rubbers to the felts. If this acid is not neutralized, the impregnating solution will change from its alkali state to an acid state and the rubber or latex will precipitate or kick out and be of no value as an impregnant. For this reason, the impregnating emulsons are preferably given a pH of at least 7. This may be done by any alkaline solution. I have used ammonia solution with advantage for this purpose. The amount of alkali is dependent upon the pH of the rubber emulsion and on the acid content of the felt.

The felts may be impregnated by any method known in the art; however, I prefer to apply the liquids by immersion. The time of immersion is adjusted according to the pick-up desired. A total pick-up of from 1 to 25% by weight of cured resinous and rubber ingredients with regard to the dried felt materials was found satisfactory, from 12 to 25% representing the preferred range.

If desired, curing catalysts, such as diammonium phosphate, tartaric acid, potassium tetraoxalate or the like may be added to the resin solution. Likewise, wetting agents may be admixed thereto. Twitchell oil, for example, was found most satisfactory for this purpose.

In the following a few examples are given which illustrate the process of my invention.

Example I

Mixture for first impregnation:

100 grams 60% solution of urea formaldehyde resin.
500 grams water.
12 grams ammonium hydroxide (28%).

The felt was dipped in a mixture of the above composition and the excess then removed by squeezing the felt. The felt was then cured at approximately 200° F. for about 2 hours and allowed to age over night. The pick-up was 11%. Thereafter, the felt was impregnated with a rubber emulsion.

Mixture for second impregnation:

100 grams butadiene acrylonitrile copolymer (aqueous emulsion with 40% solids content).
300 grams water.
4 grams ammonia (28%).

The felt was again squeezed in order to remove excess emulsion and then cured at 250° F. for 2 hours. The second pick-up amounted to 10%. The felt treated with the materials and by the method set forth in this example showed an increase of the wet abrasion resistance of approximately 133% as compared with that of the untreated wet felt. The time required for completely wetting the felts thus impregnated was 13 minutes and 37 seconds. The total water pick-up then was 162% and the water retention after squeezing of the felts was 72%. This amounts to a water differential of 90%, which illustrates the actual water absorption capacity of the felts in operation.

Example II

Mixture for first impregnation:

100 grams 60% solution of urea formaldehyde resin.
500 grams water.
1 gram Twitchell oil.
12 grams ammonia (28%).

For the second dip the same rubber emulsion was used as was used in Example I, and curing and ageing were also substantially carried out as described before. The pick-up in each impregnating step was 8%. The wet abrasion resistance was increased by the treatment by 103%. The wetting time in this example amounted to 16 minutes and 17 seconds. The total water pick-up was 206%, the water retention 84% and thus the differential 122%.

Example III

First dip:

100 grams urea formaldehyde resin solution (60%).
500 grams water.
1 gram Twitchell oil.
1 gram diammonium phosphate.
1 gram tartaric acid.

For the second dip the same rubber emulsion was used as in Example I. Curing and ageing were substantially carried out as described in Example I. The pick-ups were 8% for the first and 6% for the second impregnation. In this instance, the wet abrasion resistance was increased by 107%. The wetting time was 52 minutes and 18 seconds. The total water pick-up amounted to 137%, the water retention after squeezing to 66% and consequently the water differential to 71%.

Example IV

First dip:

100 grams urea formaldehyde resin solution (60%).
500 grams water.
1 gram Twitchell oil.
1 gram diammonium phosphate.
1 gram ammonia (28%).

Second dip:

The composition of the latex used in this example was identical with that of Example I.

The pick-ups were 8% and 13%, respectively. The increase of the abrasion resistance amounted to 117% and the wetting time to 29 minutes and 18 seconds. The water pick-up was 154%, the water retention after squeezing 77% and the water differential also 77%.

Example V

Mixture for first impregnation:

100 grams phenol formaldehyde resin (50%).
400 grams water.

The impregnated felt was cured at substantially 230° F. for 1 hour and thereafter for another hour at 285° F.

Mixture for second impregnation:

Latex and conditions were the same as in Example I.

The pick-ups were 7 and 11%, respectively. The wet abrasion resistance of the treated felt was increased by 123% and the wetting time was 70 minutes and 30 seconds. The water pick up amounted to 159%, the water retention to 76% and the water differential to 83%.

In this example the tensile strength was also increased by the treatment. Thus, the tensile strength of the warp threads increased by 16% in the dry condition and by 15% in wet condition, whereas the tensile strength of the filler threads increased by 30% in dry and by 8% in the wet condition.

Example VI

First impregnation step:

150 grams 55% solution of phenol formaldehyde resin.
400 grams water.

The resin was cured as in Example 5. The pickup amounted to 15%.

Second impregnation step:

100 grams 47% emulsion of neoprene.
370 grams water.

The rubber was cured at 250° F. for 2 hours. The rubber pick-up was 8%.

The treated felt showed an increase of the wet abrasion resistance of 183%, a wetting time of 96 minutes and 26 seconds, a total water pick-up of 163%, a water retention of 79% and a water differential of 84%. As in Example V, the tensile strengths of the warp and filler threads, both wet and dry, were also essentially increased. These increases were 21% and 26% for the dry and wet warp threads, respectively, and 22% and 17% for the dry and wet filler threads, respectively.

It will thus be seen from Examples V and VI that the phenol formaldehyde resins have the outstanding property of increasing the tensile strengths of both warp and filler threads, a feature which might become a decisive factor with regard to a great many uses of such impregnated felts.

It will be understood that while there have been described herein certain specific embodiments of the invention, it is not intended thereby to have it limited to or circumscribed by the details given, since the invention is susceptible to various modifications and changes which come within the spirit of the disclosure and the scope of the appended claims.

I claim:

1. A method of treating felts for paper making machines which comprises loading a dimensionally stable woven wool base with an aqueous solution of resin selected from the group consisting of urea-formaldehyde and phenol-formaldehyde resins, removing excess resin, curing said resin, loading the resin coated wool base with an aqueous emulsion of a synthetic rubber, removing the excess emulsion whereby the total pickup of coating solids is limited to between about 10 and 25%, said rubber being selected from the group consisting of acrylonitrile-butadiene copolymer, styrene-butadiene copolymer, and polychloroprene, and curing said deposited synthetic rubber impregnation.

2. The method of treating felts for paper making machines which comprises loading a dimensionally stable woven wool base with an aqueous solution of resin selected from the group consisting of urea-formaldehyde and phenol-formaldehyde resins, removing excess resin whereby the pickup of resin is limited to between approximately 5 and 15%, curing said resin, loading the resin coated wool base with an aqueous solution of a synthetic rubber, said rubber being selected from the group consisting of acrylonitrile-butadiene copolymer, styrene-butadiene copolymer, and polychloroprene, removing the excess emulsion whereby the total pickup of coating solids is limited to between approximately 10 and 25%, and curing said deposited synthetic rubber.

3. The method of treating felts for paper making machines which comprises loading a dimensionally stable woven wool base with an aqueous solution of resin selected from the group consisting of urea-formaldehyde and phenol-formaldehyde resins, removing excess resin whereby the pickup of resin is limited to between approximately 5 and 15%, curing said resin at approximately 200 to 300° F. for about two hours, loading the resin coated wool base with an aqueous solution of a synthetic rubber, said rubber being selected from the group consisting of acrylonitrile-butadiene copolymer, stydene-butadiene copolymer, and polychloroprene, removing the excess emulsion whereby the total pickup of coating solids is limited to between approximately 10 and 25%, and curing said deposited synthetic rubber at about 250° F. for approximately two hours.

4. As a new article of manufacture, a felt for paper making machines comprising a dimensionally stable woven wool base impregnated with 5 to 15% by weight of a resin selected from the group consisting of urea-formaldehyde and phenol-formaldehyde resins, a superimposed layer of synthetic rubber, said rubber being selected from the group consisting of acrylonitrile-butadiene copolymer, styrene-butadiene copolymer, and polychloroprene, and the total pick-up of coating being limited to between approximately 10 and 25% whereby the fibers remain unmatted.

5. As a new article of manufacture, a felt for paper making machines comprising a dimensionally stable woven wool base impregnated with a resin selected from the group consisting of urea-formaldehyde and phenol-formaldehyde resins, and a superimposed impregnation of synthetic rubber selected from the group consisting of acrylonitrile-butadiene copolymer, styrene-butadiene copolymer, and polychloroprene, and the total pickup of coating being limited to about 10 to 25% whereby the fibers remain unmatted.

O. WILLIAM BERGLUND.

REFERENCES CITED

The following references are of record in the file of this patent:

UNITED STATES PATENTS

| Number | Name | Date |
|---|---|---|
| 1,967,863 | Collins et al. | July 24, 1934 |
| 2,038,712 | Brodin | Apr. 28, 1936 |
| 2,211,951 | Hershberger | Aug. 20, 1940 |
| 2,211,959 | Maney | Aug. 20, 1940 |
| 2,327,573 | Walsh | Aug. 24, 1943 |

OTHER REFERENCES

"Paper Trade J." of November 5, 1942, pages 239–242.